United States Patent [19]
Dailey

[11] 3,803,025
[45] Apr. 9, 1974

[54] METHOD OF INTRODUCING HYDROGEN INTO A HYDROGEN CONSUMING REACTOR CIRCUIT

[75] Inventor: Lawrence W. Dailey, Los Angeles, Calif.

[73] Assignee: The Ralph M. Parson Company, Los Angeles, Calif.

[22] Filed: Sept. 22, 1967

[21] Appl. No.: 669,950

[52] U.S. Cl............ 208/107, 55/23, 55/89, 208/58, 208/95, 208/100, 208/103, 208/108, 208/134, 208/142, 208/209, 208/254 H, 423/210, 423/648, 423/650
[51] Int. Cl. ..... C10g 13/00, C01b 1/16, C01b 1/32
[58] Field of Search ............ 208/95, 107, 108, 100, 208/103, 254 H

[56] References Cited
UNITED STATES PATENTS

| 3,401,111 | 9/1968 | Jackson | 208/108 |
| 3,551,106 | 12/1970 | Smith et al. | 208/107 |
| 3,567,381 | 2/1971 | Beavon et al. | 423/650 |
| 3,576,603 | 4/1971 | Smith et al. | 423/650 |
| 3,577,221 | 5/1971 | Smith et al. | 423/653 |
| 3,694,344 | 9/1972 | Munro | 208/108 |
| 3,401,111 | 9/1968 | Jackson | 208/108 |

*Primary Examiner*—Delbert E. Gantz
*Assistant Examiner*—G. E. Schmitkons
*Attorney, Agent, or Firm*—Christie, Parker and Hale

[57] ABSTRACT

A diluent stream is combined with hydrogen of relatively high purity to form a resultant stream which is compressed by centrifugal compression to a sufficiently high pressure to enter a reactor circuit within which hydrogen is consumed. The diluent stream is generated from an effluent stream emanating from the hydrogen consuming reactor circuit. The average molecular weight of the resultant stream is sufficiently high for the economic use of one or more centrifugal compressors. After compression, the resultant stream is combined with the effluent stream coming from the hydrogen consuming reactor or reactors in the reactor circuit. The contained hydrogen and other volatile constituents of the combined resultant and effluent streams are then separated from the combined streams and introduced into the reactor.

13 Claims, 1 Drawing Figure

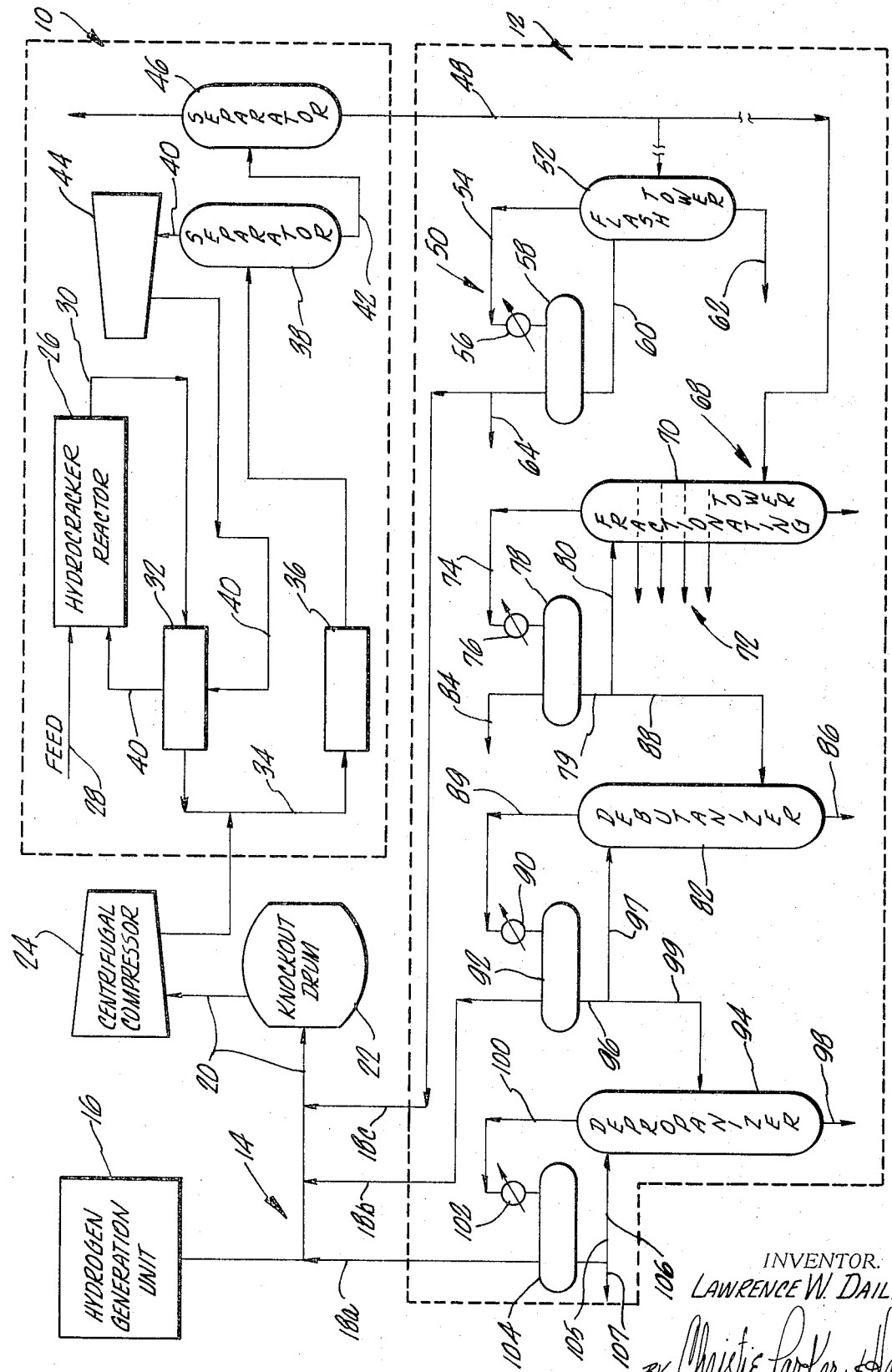

METHOD OF INTRODUCING HYDROGEN INTO A HYDROGEN CONSUMING REACTOR CIRCUIT

BACKGROUND OF THE INVENTION

This invention relates to the art of hydrocarbon refining and, more in particular, to an improved method for introducing hydrogen into hydrogen consuming reactor circuits where, for example, hydrocracking, hydrotreating, hydrogenation, desulfurization, denitrogenation, olefin saturation, and other similar reactions occur.

Reactor circuits are employed to convert a hydrocarbon feed material of a relatively high molecular weight into lighter products, such as gasoline, or to convert sulfur, nitrogen, oxygen and halide containing compounds into a hydrogenated material. The conversion occurs in a reactor in the presence of one or more catalysts at elevated temperatures and pressures. These reactor circuits are characterized by the fact that a considerable amount of molecular hydrogen is consumed in the process.

The hydrogen consumed in these processes is usually obtained from a hydrogen plant which generates its product at pressures considerably lower than those employed in the hydrogen consuming reactor circuits. Hydrogen is often produced at pressures ranging from 200 to 500 psig whereas the hydrogen consuming reactor circuit usually operates at a minimum pressure of about 1,000 psig.

Previously, the pressure of the hydrogen was increased to a pressure consonant with introduction into the hydrogen consuming reactor circuit by reciprocating compressors. Reciprocating compressors were used because they were thought to be the most economical method of obtaining the requisite hydrogen introduction pressure. Reciprocating compressors, however, are costly and are not as reliable as would be desired for the introduction of hydrogen into most hydrogen consuming reactor circuits. This type of compressor requires periodic overhaul, typically every three or four months, which means that the hydrogen consuming reactor circuit must be shut down for the period of overhaul or two parallel, partial capacity compressors used. The use of a second compressor obviously increases the cost of the plant and does not entirely overcome the shutdown loss because plant capacity is reduced when both compressors are not in use.

Centrifugal compressors, on the other hand, are normally considered more reliable and economical. However, the use of centrifugal compressors to compress molecular hydrogen to the reactor circuit introduction pressure has not been attempted because of the number of compressor stages required to handle the volume of hydrogen consumed in these circuits. The large number of compression stages is required because of the low molecular weight of hydrogen with its concomitant low head.

It is to a method of economic use of centrifugal compression to introduce hydrogen into hydrogen consuming reactor circuits that this invention is directed.

SUMMARY OF THE INVENTION

The invention contemplates the formation of a resultant stream of hydrogen and a diluent. This resultant stream has a sufficiently high average molecular weight to enable the use of one or more centrifugal compressors to compress the resultant stream to the reactor circuit introduction pressure.

In more specific terms, the invention includes a reactor circuit which has at least one reactor. Petroleum, shale oil, tar, oil-from-coal, or some other hydrocarbon feed material is introduced into the reactor and converted into reactor effluent in the presence of molecular hydrogen from a make-up stream. Typically, the reactor effluent includes recycle gas, net liquid products, and possibly recycle liquids in a mixture of hydrocarbons ranging from hydrogen to hydrocarbons having a boiling point largely determined by the boiling point of the feed material but typically 650° F. or higher. A diluent stream is produced from the reactor effluent and combined with hydrogen at relatively low pressures, for example, 200 to 500 psig, to form a resultant stream having an average molecular weight which is sufficiently high for compression in at least one centrifugal compressor. The centrifugal compressor raises the pressure of the resultant stream to that required for introduction into the reactor circuit. The average molecular weight of the resultant stream required depends on the operating pressure of the reactor circuit and will increase as the circuit pressure increases. After its compression in the centrifugal compressor, the resultant stream is introduced into the reactor circuit where the diluent material is separated from the hydrogen. After its separation from the diluent, the hydrogen is introduced into the make-up stream entering the reactor. In the reactor, the hydrogen is used in the conversion of the feed material to form the reactor effluent.

Preferably, the compressed resultant stream is introduced into the reactor effluent stream prior to the time that the recycle gas is separated from the liquid contained in the reactor effluent. The reactor effluent from the hydrocracker reactor, as was previously mentioned, contains a broad range of compounds, the gases of which are normally recycled as a part of the stream returning to the reactor. It is preferred to use the liquids contained in the reactor effluent as an absorption or sponging medium for separating diluent from the hydrogen. Separation may take place in the standard separator employed to obtain the recycle gas. Thus, it is preferred to introduce the resultant stream upstream from the separator which is used to separate recycle gas from the liquid portion of the reactor effluent to obtain purification of the hydrogen stream prior to the time that it contacts the catalyst in the reactor. The diluent absorbed by the liquid portion of the reactor effluent stream is preferably separated from this liquid for recycling into the resultant stream. This may be accomplished by simple flashing or fractional distillation in a standard rectifying column wherein heavier materials are separated from lighter products to form the diluent stream.

The diluent stream itself is typically composed of propane or butane or both in either vapor or liquid phase. If the diluent contains liquid, the liquid should be converted to vapor or removed before introduction into the centrifugal compressor. In general, the diluent stream may be composed of hydrocarbon products having between three and ten carbon atoms per molecule. The resultant stream should have an average molecular weight sufficient for economic compression by a centrifugal compressor or compressors. In general, the molecular weight of the resultant stream which renders the use of centrifugal compressors economical and practical has a minimum value of from six to twelve. However, the optimum molecular weight of the resultant stream of diluent and hydrogen will vary depending upon the operating pressure of the reactor system and the pressure at which molecular hydrogen is introduced into the diluent stream. Thus the average molecular weight may, under certain conditions, fall outside the range of molecular weights discussed.

The process of the present invention allows the use of centrifugal compression for the introduction of hydrogen into reactor circuits. Centrifugal compression offers enhanced reliability and economy over reciprocating type compressors as evidenced by the former's longer online operating time between overhaul.

These and other features, aspects and advantages of the present invention will become apparent from the following description, appended claims and drawing.

BRIEF DESCRIPTION OF THE DRAWING

The single FIGURE is a schematic flow diagram illustrating the process of the present invention as applied to a hydrocracker reactor circuit.

DESCRIPTION OF THE PREFERRED EMBODIMENTS

The hydrocracker reactor system illustrated in the FIGURE includes a hydrocracker reactor circuit 10, a diluent formation circuit 12 and a hydrogen make-up circuit 14. In general, relatively high purity hydrogen is combined with a diluent in make-up circuit 14 to form a resultant stream having an average molecular weight which is sufficiently high for economic compression by one or more centrifugal compressors. The compressed resultant stream is introduced into hydrocracker reactor circuit 10 where the contained hydrogen is separated for use in the circuit's hydrocracker reactor.

Hydrogen make-up circuit 14 includes a hydrogen generation unit 16 which produces hydrogen for mixture with a diluent from one of the diluent streams 18a, 18b or 18c to form a resultant stream 20. The molecular weight, quality, quantity, and phase condition of the diluent combined with hydrogen is selected to produce a relatively high molecular weight resultant stream. The resultant stream passes into a knockout drum 22 where contained liquid in the stream is eliminated. Knockout drum 22 is provided to insure that the resultant stream entering centrifugal compressor 24 is essentially all vapor in order to protect the compressor from damage by liquid. The resultant stream passing from knockout drum 22 is compressed by one or more centrifugal compressors 24 to a pressure consonant with its introduction into hydrocracker reactor circuit 10.

Typically, hydrogen generation unit 16 produces hydrogen at a pressure from 200 to 500 psig. The generation unit may produce hydrogen by steam-methane reforming of hydrocarbon-rich gases, partial oxidation of gas, liquid or solid fuels, or by other methods. Preferably, the hydrogen is of relatively high purity, in the range of from about 93 to about 98 mol percent and should normally contain from 2 to about 7 mol percent methane. The diluent is introduced into the resultant stream at about the pressure of the hydrogen from generation unit 16. The centrifugal compressor compresses resultant stream 20 to hydrocracker reactor circuit pressure which is typically from about 1,000 to 5,000 psig.

The molecular weight of resultant stream 20 is sufficient for economic use of centrifugal compressor 24. The required molecular weight is a function of the outlet pressure from the centrifugal compressor and thus the pressure in hydrocracker reactor circuit 10. In general, this functional relationship requires that the average molecular weight of the resultant stream increases as the hydrocracker reactor circuit pressure increases because the pressure differential across centrifugal compressor 24 increases. In most applications, resultant stream 20 should have a minimum molecular weight of from 6 to 12.

As will become apparent as this description proceeds, the molecular weight, quantity, quality, and phase condition of the hydrocarbon constituents of diluent streams 18a through 18c is variable within wide limits so long as the molecular weight of the resultant stream is sufficient for economic use of centrifugal compression. Suitable diluents may be propane, mixed propane and butane or a wide range of hydrocarbons which includes propane and butane as well as $C_5$ and higher molecular weight constituents. The diluent should be of hydrocarbons which in the resultant stream are in vapor phase at the temperature and pressure of compression in the centrifgual compressor. In addition, the diluent should be produced in the hydrocracker system and be readily, but not necessarily completely, separated from the hydrogen after compression by the centrifugal compressor. In some circuits, for example, where hydrogen is compressed from about 200 to about 1,500 psig, pentanes and small amounts of heavier hydrocarbons may be preferred as the diluent constituent materials. Pentanes do not condense at these pressures and because of their molecular weight relatively smaller amounts of pentanes are required to produce a resultant stream having a sufficiently high average molecular weight for economic centrifugal compression.

Hydrocracker reactor circuit 10 includes a hydrocracker reactor 26. A feed stream 28 of material to be converted in the hydrocracker reactor system is introduced into reactor 26. The feed stream material is typically a hydrocarbon oil from petroleum, shale oil, tar, oil-from-coal, or other sources. The hydrocracker reactor itself, as is well known, employs either a fixed or moving catalytic bed, heat, pressure and hydrogen for converting the feed material into reactor products. In many plants, the ultimate product from the hydrocracker reactor system is, primarily, gasoline. The reactor products leave hydrocracker reactor 26 as a reactor effluent stream 30 and pass through heat exchanger 32, which may be a single or several heat exchange services, after which it is combined with resultant stream 20 to form a mixed stream 34. The mixed stream will include reactor products, recycle gas, possibly recycle liquid, diluent and hydrogen. The mixed stream passes through one or more heat exchangers 36 where its temperature is lowered for introduction into a high pressure separator 38. Heat exchanger 36 may be an air or water cooler. In high pressure separator 38, the mixed stream is separated into a predominantly hydrogen-rich vapor stream 40 and a liquid stream 42. Liquid stream 42 includes the diluent, the hydrocracker reactor products and any liquid recycle. The liquid portion of the reactor effluent stream acts as a sponging medium to take out diluent and purify the vapor stream.

Vapor stream 40, in general, is composed of from 50 to 90 mol percent hydrogen with its remaining portions being recycle reactor gas comprising nitrogen, hydrogen sulfide, ammonia, water vapor, carbon oxides, $C_1$, $C_2$, $C_3$, iso and normal $C_4$ and heavier components through about $C_{10}$. Vapor stream 40 is the hydrogen containing stream for use within hydrocracker reactor 26. Because of the relatively high partial pressure of hydrogen required by the reactions occurring in hydrocracker 26, the diluent must be essentially completely separated from the hydrogen in high pressure separator 38. Complete separation would not be possible, for example, if the diluent were primarily methane which would result in a partial pressure of hydrogen in stream 40 which is too low for effective use in the hydrocracker reactor. Stream 40 is compressed in compressor 44 to a pressure sufficient to enter hydrocracker reactor 26. Vapor stream 40 continues from compressor 44 through heat exchanger 32 and into hydrocracker reactor 26 either by itself or sometimes in admixture with all or a part of feed stream 28. As it passes through heat exchanger 32, all or a part of vapor stream 40 may take on heat from reaction product stream 30. Additional heat may be supplied from a fired heater or other source, if required. Furthermore, a part of vapor stream 40 may be diverted from compressor 44 to hydrocracker reactor 26 and used for quenching or other service, without passing through heat exchanger 32.

Liquid stream 42 which comes from high pressure separator 38 has as its constituents a substantial part of the diluent, net reactor product and any liquid recycle. The stream passes into one or more lower pressure separators represented by reference numeral 46 for further processing where vapors leave from the top and heavier constituents pass as a hydrocracker reactor section effluent stream 48. The vapors may be used for fuel or recovered in further processing steps.

The hydrocracker reactor circuit described above may be modified to suit the particular requirements of a plant. The reactor circuit, however, includes provision for processing resultant stream 20 in separator 38 to remove a major portion of the diluent materials from the hydrogen to prepare the latter for introduction into hydrocracker reactor 26. In this separation, the liquid components of the hydrocracker reactor effluent act as a sponging or absorbing medium in separator 38 to substantially separate the diluent material from the hydrogen and recycle gas from the reactor product stream. In addition, the hydrocracker reactor circuit is important to illustrate the point and condition of resultant stream entrance into the circuit. The point of introduction is where the pressure of the reactor effluent and resultant stream 20 are essentially equal. Moreover, the introduction point is preferably where the temperature of the reactor effluent stream and the resultant stream are also essentially equal. When the temperature of resultant stream 20 at its point of introduction into reactor effluent stream 40, and that of the reactor effluent stream 40 are essentially equal, the heat exchange efficiency in reactor circuit 10 will not be significantly altered over the efficiency existing in a well designed reactor circuit and, therefore, operating expense is minimized.

The hydrocracker reactor section effluent stream emanating from separator 46 contains a substantial portion of the diluent material, the hydrocracker reactor product material, and any liquid recycle. This effluent stream 48 is further processed to separate the diluent constituent. As was previously mentioned, the diluent may range from essentially propane to a wide range of hydrocarbons including $C_5$ through $C_{10}$. The circuit represented by reference numeral 12 effects the separation of diluent and represents several alternate branches which may be independently or interdependently operated to obtain the desired diluent for mixture with hydrogen from hydrogen generation unit 16.

The first diluent separation branch of circuit 12 is represented by reference numeral 50. Effluent stream 48 is introduced into flash tower 52 where, after a possible pressure reduction and heating, the major portion of the gas contained in the charge to the flash tower is separated from the liquid. The overhead from flash tower 52 is discharged through line 54 where it passes through condenser 56 and into reflux accumulator 58. Reflux stream 60 is taken from accumulator 58 and introduced into flash tower 52. The bottom liquid product from flash tower 52 is taken as a stream through line 62 where it may be further fractionated to separate net products from recycle liquid. A part of the light products coming from reflux accumulator 58 constitute diluent stream 18c. A portion of this stream is divided out as stream 64 for use as fuel or for recovery by way of further processing. Diluent stream 18c mixes with hydrogen from hydrogen generation unit 16 to form resultant stream 20 prior to the latter's introduction into knockout drum 22. Diluent stream 18c will typically contain a broad range of hydrocarbon constituents including butane, propane, iso and normal pentanes and hydrocarbons through $C_{10}$.

The second branch of circuit 12 is denominated by reference numeral 68. Hydrocracker reactor section effluent stream 48 passes into fractionating tower 70 where desired distillate products are recovered as streams 72. The overhead from fractionating tower 70 passes as a stream 74 through condenser 76 and into reflux accumulator 78. Stream 79 passes from reflux accumulator 78 and is divided into reflux stream 80 and stream 88. Reflux stream 80 is introduced into fractionating tower 70 while stream 88 passes into a debutanizer 82. Stream 84 from reflux accumulator 78 contains vapors for use as fuel or for recovery in further processing. Debutanizer 82 removes essentially butane and propane from stream 88. The butane and propane leave debutanizer 82 as an overhead stream 89. Stream 86 is typically pentanes and heavier. A part of overhead stream 89 may be used without further processing as diluent or it may, as illustrated, pass through condenser 90 into reflux accumulator 92 where its heavier hydrocarbon constituents are separated for introduction into a depropanizer 94 and refluxing in debutanizer 82. Thus, stream 96 leaves reflux accumulator 92 and is divided into a reflux stream 97 which passes into debutanizer 82 and stream 99 which is introduced into depropanizer 94. Diluent stream 18b is taken from reflux accumulator 92 as relatively pure diluent gas primarily of butane and propane.

Depropanizer 94 processes the constituents of stream 99 to obtain a propane stream 107. Butane leaves depropanizer 94 as a stream 98. An overhead propane stream passes from depropanizer 94 in a line 100, through a condenser 102 and into a reflux accumulator 104. Thus stream 105 leaves reflux accumulator 104 and is divided into reflux stream 106 which passes into depropanizer 94 and a product propane stream 107. Diluent stream 18a is taken from reflux accumulator 104 for combination with the hydrogen stream coming from hydrogen generation unit 16. The make-up of diluent stream 18a is primarily propane, typically in vapor phase. Alternately, a part of the liquid propane stream 107, or a part of the liquid butane stream 98 may be used as the diluent stream.

The sequence of debutanizing and depropanizing illustrated by reference numeral 68 effects the separation of butane and propane from the hydrocracker reactor section effluent stream 48, followed by the removal of butane to achieve a diluent of essentially propane as stream 18a. This sequence, however, can be reversed if plant economies dictate that it should be done with the result that stream 18a becomes primarily butane.

This invention has been specifically described with reference to its application for hydrocracker reactor circuits. The application of this invention to other hydrogen consuming processes where hydrotreating, hydrogenation, desulfurization, denitrogenation, olefin saturation, and similar reactions occur when processing petroleum, shale oil, tar, oil-from-coal, or other hydrocarbon feed material is essentially the same as this described application to hydrocracking, as will be obvious to those skilled in the art. The spirit and scope of the appended claims should not, therefore, be limited to the specific description of a hydrocracker reactor circuit application.

What is claimed is:

1. In a relatively high pressure hydrogen consuming process of the type wherein hydrocarbon feed material is introduced into a hydrogen consuming reactor circuit and converted in at least one reactor to form a reactor effluent stream containing reactor products with the conversion occurring in the presence of hydrogen from a vapor stream, an improvement in the method of introducing the hydrogen into the hydrogen consuming reactor circuit comprising the steps of:

a. producing a hydrocarbon diluent from the reactor effluent having a relatively high molecular weight compared to hydrogen;
   b. combining the diluent with hydrogen at a relatively low pressure to form a resultant stream having an average molecular weight which enables compression of such stream by centrifugal compression to an introduction pressure which is sufficient for the resultant stream to enter the hydrogen consuming reactor circuit;
   c. compressing the resultant stream in at least one centrifugal compressor to the introduction pressure;
   d. combining the compressed resultant stream with at least a portion of the reactor effluent stream including a gas and liquid;
   e. separating at least a substantial amount of the liquid and hydrogen diluent from the combined streams, the reactor effluent liquid absorbing said hydrogen diluent; and
   f. introducing the gaseous reactor products and the hydrogen separated from the diluent into the vapor stream.

2. The process claimed in claim 1 wherein the diluent comprises essentially hydrocarbon constituents ranging from $C_3$ through $C_{10}$.

3. The process claimed in claim 1 wherein the temperature of the compressed resultant stream is essentially equal to the temperature of the reactor effluent stream where the resultant stream is introduced into the reactor effluent stream.

4. The process claimed in claim 3 wherein the resultant stream has a minimum average molecular weight of from about 6 to about 12.

5. The process claimed in claim 4 wherein the diluent comprises essentially hydrocarbon constituents ranging from $C_3$ through $C_{10}$.

6. The process claimed in claim 1 wherein the diluent comprises essentially propane and butane.

7. The process claimed in claim 1 wherein the diluent comprises essentially propane.

8. The process claimed in claim 1 wherein the diluent comprises essentially butane.

9. The process claimed in claim 1 wherein the diluent comprises essentially pentane and small amounts of heavier hydrocarbon constituents.

10. The process claimed in claim 4 wherein the diluent comprises essentially pentane and small amounts of heavier constituents.

11. The process claimed in claim 4 wherein the diluent comprises essentially propane and butane.

12. The process claimed in claim 4 wherein the diluent comprises essentially propane.

13. The process claimed in claim 4 wherein the diluent comprises essentially butane.

* * * * *